Jan. 21, 1958     W. E. BRADLEY     2,820,944
METHOD OF AND MEANS FOR MEASURING FREQUENCY
Filed Sept. 23, 1952     2 Sheets-Sheet 1

INVENTOR.
WILLIAM E. BRADLEY
BY Brown, Jenk & Lynnestvedt
AGENTS

Jan. 21, 1958 W. E. BRADLEY 2,820,944
METHOD OF AND MEANS FOR MEASURING FREQUENCY
Filed Sept. 23, 1952 2 Sheets-Sheet 2
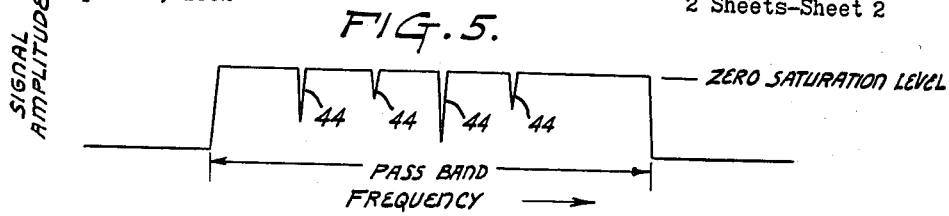
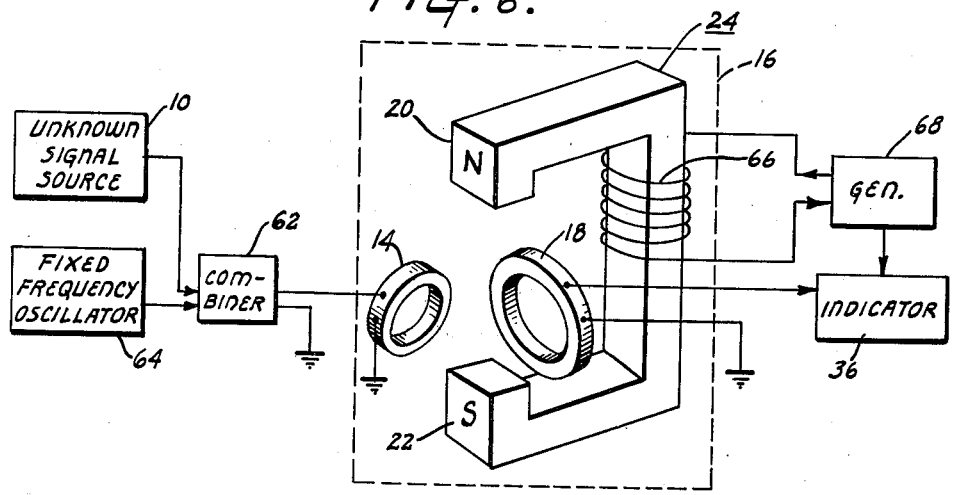
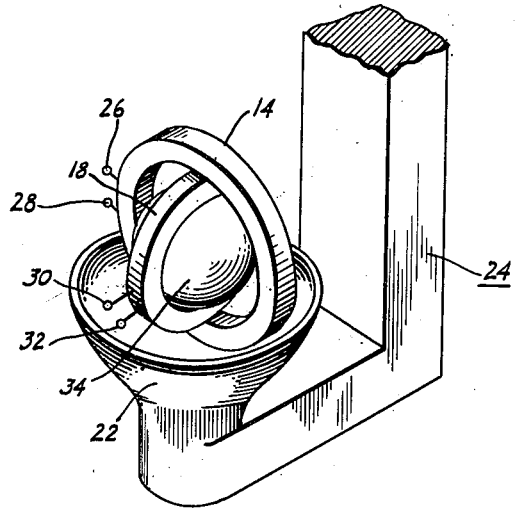
INVENTOR.
WILLIAM E. BRADLEY
BY
Brown, Denk & Synnestvedt
AGENTS United States Patent Office 2,820,944
Patented Jan. 21, 1958

2,820,944

METHOD OF AND MEANS FOR MEASURING FREQUENCY

William E. Bradley, New Hope, Pa., assignor to Philco Corporation, Philadelphia, Pa., a corporation of Pennsylvania Application September 23, 1952, Serial No. 311,108

9 Claims. (Cl. 324—0.5)

This invention relates to frequency measuring systems and methods and more particularly to systems and methods for measuring the frequency and amplitude of the components of a complex wave.

It is well known that any complex wave may be analyzed by breaking it down into a series of related sinusoidal waves, each wave having a definite frequency, amplitude and phase. If the complex wave is periodic in nature or contains periodic components, the frequency and amplitude of the periodic components of the wave may be measured by passing the complex wave through a circuit known as a harmonic analyzer. One type of harmonic analyzer comprises an input circut followed by a plurality of narrow passband filter elements connected in parallel. Each channel in this type of analyzer is provided with a separate amplitude measuring device. Alternatively, a switch is provided for selectively connecting a single amplitude measuring device to each of the filter elements in rotation. The accuracy of the frequency measurement and the complexity of the system are both directly related to the number of filter elements employed to cover a particular band of frequencies. As a result, some sacrifice in accuracy is generally made in order to simplify the circuit.

A second type of harmonic analyzer includes a single tuned circuit, a variable frequency oscillator and a mixer circuit. The signal to be analyzed and the signal from the variable frequency oscillator are combined in the mixer circuit and then applied to the single tuned circuit which acts as a bandpass filter. A signal indicating device coupled to the output of the filter indicates the amplitude of beat frequency signals resulting from the mixing of the two signals. The frequency and amplitude of the components of the complex wave may be computed from the known characteristics of the filter and the variable frequency oscillator. Both of the above-described systems and other systems analogous thereto rely on conventional filters or resonant elements for the frequency separation and hence are subject to the disadvantages arising from the physical limitations of conventional filters such as relatively broad passbands and sloping cut-off characteristics.

Comparatively recent developments in the study of atomic nuclei have demonstrated that atomic nuclei can be made to act as extremely narrow band filters by the application thereto of an external magnetic field of appropriate strength. The bandwidth may be of the order of 3 or 4 cycles at an operating frequency of several megacycles. By controlling the distribution of the magnetic field throughout the volume of the atomic nuclei being influenced, a number of these very narrow band filters can be combined to give a filter having a passband of considerable width. This can be done without in any way broadening the passband of the individual filters.

It is also known that these extremely narrow band filters are separately saturable by the application thereto of a signal having a frequency corresponding to the resonant frequency of the individual filter. Coupling to such a filter is provided by input and output coils which are positioned so as to surround the volume containing the atomic nuclei influenced by the external magnetic field. Direct coupling between the two coils is prevented by orienting the coils in perpendicular planes intersecting along an axis common to the two coils. Electrostatic shielding may be employed if necessary to eliminate any stray coupling between input and output circuits. The assembly including the input and output coils, the magnet and a source of atomic nuclei is generally referred to as a nuclear inductor.

The first characteristic of atomic nuclei mentioned above led to the development of fluxmeters which are now commercially available. However, it is believed that the application of these characteristics to the field of harmonic analyzers was unknown prior to the conception of the present invention.

Therefore it is an object of the present invention to provide a new and improved frequency measuring system.

It is a further object of the invention to provide a harmonic analyzer that will cover a wide band of frequencies without adjustment of circuit parameters.

Still another object of the invention is to provide a harmonic analyzer which will temporarily record the frequencies of signals applied thereto.

A further object of the invention is to provide a method of measuring the frequency of the components of a complex wave during the temporary absence of that wave.

A more particular object of the invention is to provide a harmonic analyzer in which the accuracy of the frequency measurement is independent of the range of frequencies to be measured.

These and other objects of the invention which will appear as the description of the invention proceeds are accomplished by applying the complex wave to be analyzed to the input coil of a nuclear inductor having a relatively broad, flat passband. The level of the input signal is set so that all important components of the complex wave have amplitudes exceeding the saturation level of the nuclear inductor. After a short period of time the saturation effects produced by the complex wave are examined by momentarily interrupting the complex wave and applying a signal to the input coil that sweeps in frequency across the passband of the inductor. Alternatively, the magnetic field may be varied uniformly and rapidly to cause the passband of the inductor to sweep across a fixed frequency located just outside the normal passband of the inductor. A fixed frequency signal applied to the input coil and an indicator connected to the output coil will provide the desired information on the condition of saturation of the nuclear inductor. In either case, the amplitude and frequency of the various components of the complex wave are indicated by a reduction in amplitude of the output signal derived from the scanning signal at the saturated positions in the passband of the inductor.

For a better understanding of the invention together with other and further objects thereof reference should now be made to the following detailed description which is to be read in conjunction with the accompanying drawings in which:

Fig. 4 is an isometric view, partly broken away, of the inductor of Figs. 2 and 3;

Fig. 5 is an amplitude versus frequency plot of the signal received by the indicator in the system of Fig. 1; and Fig. 6 is a diagram in block form of a second preferred embodiment of the present invention.

Figure 1:
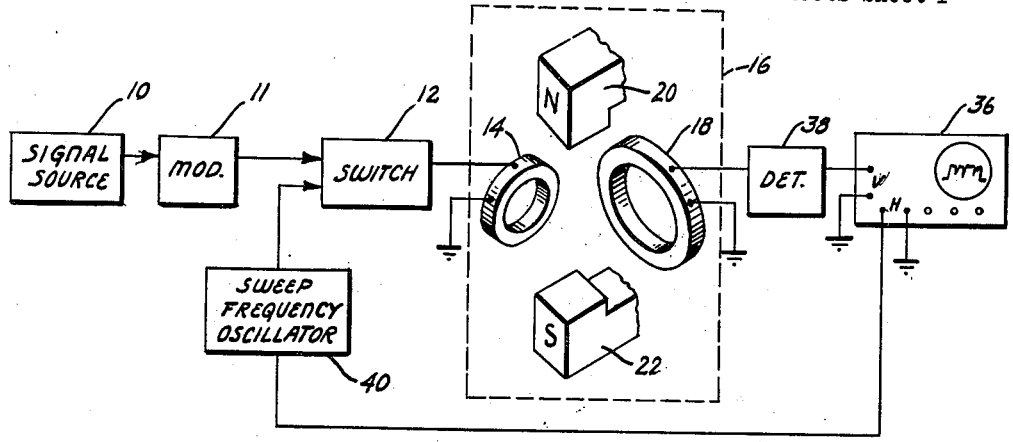
Fig. 1 is a block diagram of one preferred embodiment of the invention.

In Fig. 1, block 10 represents the source of the complex wave to be examined. Source 10 may be an electrical or electronic circuit generating the wave directly, a radio receiver receiving the wave from a distant point, or a transducer receiving a complex mechanical vibration and translating it into electrical waves. The signal from source 10 is applied through a modulator 11 and switch 12 to the input coil 14 of nuclear inductor 16. Switch 12 may be a mechanically operated single pole, double throw switch arranged to connect either one of two signal sources to coil 14. However, in many instances it will be advantageous to employ some form of electronic switch in place of the mechanical switch described above. For reasons that will appear presently, it may be desirable to add the complex wave from source 10 to a carrier frequency before applying it to coil 14. This is accomplished in modulator 11. One or more stages of amplification or an attenuator may be required between source 10 and coil 14 depending upon the amplitude level of the signal from source 10. It will be assumed that the necessary amplification or attenuation is provided for in modulator 11.

In Fig. 1 certain parts of nuclear inductor 16 have been omitted and certain other parts have been displaced from their true position in order to show the electrical connection between the inductor and the external circuit.

Figure 2:
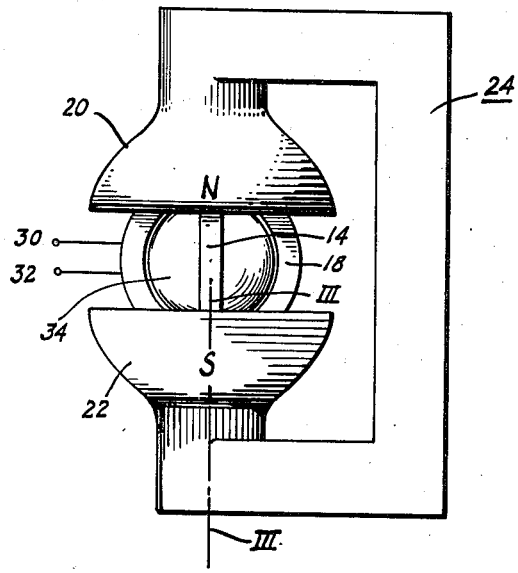
Fig. 2 is a side elevation of a nuclear inductor forming a part of the system of Fig. 1.
Figure 3:
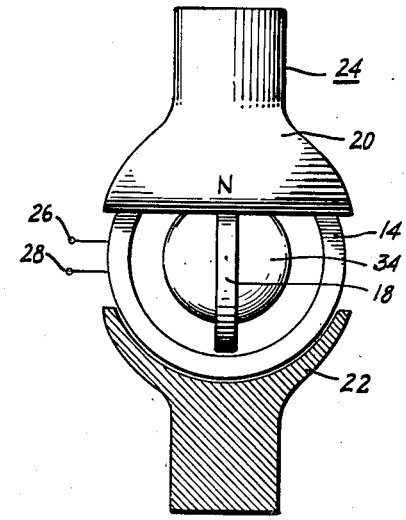
Fig. 3 is an elevation of the inductor of Fig. 2 taken in a plane at right angles to the viewing plane of Fig. 2 with the front half of the lower pole piece broken away along the line III—III of Fig. 2.

Therefore, reference should now be made to Figs. 2, 3 and 4 for a more complete illustration of inductor 16. As shown in Figs. 2, 3 and 4, input coil 14 and output coil 18 are disposed in mutually perpendicular planes within the region bounded by the north and south pole pieces 20 and 22 of a magnet 24. Coils 14 and 18 have a common diameter which is coincident with the axes of the pole pieces of magnet 24. Coil 14 is formed of several circular loops of a single conductor, each loop being disposed in the plane of the coil. The ends of the conductor are brought out at 26 and 28 to provide input terminals to which the signal from switch 12 may be applied. Coil 18 is similarly formed of several conductive turns disposed in a plane normal to the plane of coil 14. The ends of the conductor forming coil 18 are brought out to terminal 30 and 32. Coil 18 is formed with an outer diameter substantially equal to the inner diameter of coil 14 so that the two coils together define a substantially spherical common volume. Disposed within this common volume is a non-magnetic container 34 which is filled with a material that will supply the atomic nuclei essential to the operation of the inductor. By way of specific example, container 34 may be a glass container filled with distilled water which supplies hydrogen nuclei or protons. The inductor will operate with a wide variety of nuclei but hydrogen nuclei are preferred because they have the highest ratio of magnetic moment to gyroscopic moment of any of the elements. Pole pieces 20 and 22 of magnet 24 are shaped so as to provide a magnetic field directed parallel to the common diameter of coils 14 and 18 and extending throughout the volume enclosed by container 34. The intensity of this magnetic field is preferably of the order of several kilogauss. For reasons that will appear as the description of the invention proceeds, pole pieces 20 and 22 are so shaped that not all incremental volumes within container 34 are subjected to the same magnetic field. Preferably the distribution of the magnetic field is such that the magnetic field varies uniformly over a rather small range so that equal volumes are permeated by each different intensity of magnetic field. Figs. 2, 3 and 4 are not intended as design drawings of the nuclear resonator 16 and no design data is included herein since the design of magnetic pole pieces to give a particular distribution of magnetic field is a highly developed and widely practiced art and for the further reason that nuclear inductors of the type described have been made commercially available in the form of sensitive fluxmeters and have thus become familiar to the designers in the art to which this invention relates. The resonant frequencies of the atomic nuclei may fall within the range of 10 to 60 megacycles for magnetic fields of the order of several kilogauss. If source 10 represents a receiver, a signal composed of the complex wave modulated on a carrier frequency falling within this range may be obtained from the intermediate frequency amplifier of the receiver. Under these conditions the modulator 11 may be omitted. If source 10 represents a source of complex wave having only video frequency components, modulator 11 supplies the necessary carrier frequency. It will be remembered that raising the frequency of the various components in this manner does not decrease the accuracy of frequency measurement since the atomic nuclei have a passband limited to a very few cycles even at the higher frequencies. The optimum value of carrier frequency and magnetic field strength to be employed is determined in part by the maximum frequency to be measured and the range of frequencies covered by the various components of the complex wave. Therefore, the values given above for frequency and magnetic field strength should be considered as illustrating only one of many possible combinations.

Referring once again to Fig. 1, the output coil 18 is coupled to an indicator 36 through detector 38 shown in block form. The detector circuit removes the carrier frequency added by modulator 11 or already present in the signal from source 10 and supplies the indicator with a signal that is amplitude modulated by the characteristics of inductor 16. In a preferred embodiment of the invention, indicator 36 may be a cathode-ray oscilloscope provided with horizontal and vertical beam deflecting means. Detector 38 is connected to the vertical deflecting means so that signals from coil 18 produce an upward deflection from the screen of the oscilloscope. The horizontal sweep for indicator 36 is controlled by a signal received from a sweep frequency oscillator 40. Preferably sweep frequency oscillator 40 produces a constant amplitude, variable frequency signal. The frequency of this signal preferably starts at some value near the lower cut-off frequency of nuclear inductor 16 and increases uniformly with time until it reaches the upper cut-off frequency of nuclear inductor 16. The horizontal sweep of indicator 36 is controlled so that the horizontal displacement of the beam from a selected reference line is indicative of the instantaneous frequency of the signal supplied by oscillator 40. A signal from oscillator 40 is also applied to a second input of switch 12. As explained above, switch 12 is so constructed that the signal from either source 10 or oscillator 40 may be connected to coil 14 as desired, but both signals are not so connected at the same time.

It can be shown that the ability of the nuclei to transfer energy from coil 14 to coil 18 is substantially linear for signal amplitudes below a critical value, but for amplitudes above this critical value a saturation effect is encountered which reduces the amount of energy transferred from coil 14 to coil 18. This saturation phenomenon is not susceptible of simple explanation but is well recognized by those familiar with nuclear induction. It is best explained by stating that, with a periodic signal whose amplitude is constant and in excess of a critical value applied to the input coil of a nuclear inductor, the output signal will gradually decrease in amplitude with time until it finally reaches zero amplitude. Upon removal of the input signal, the ability of the atomic nuclei to transfer a signal from the input coil to the output coil is gradually restored. This restoration period may be of the order of several seconds in duration. For a uniform magnetic field, the range of frequencies that will be coupled from coil 14 to coil 18 is limited to a bandwidth of 3 or 4 cycles even though the center of the band may be at a frequency of the order of 10 to 60 megacycles. Therefore a nuclear inductor acts as an extremely narrow band-pass filter. The bandwidth of a nuclear inductor can be increased by causing the magnetic field to vary in strength over the volume enclosed by container 34. If this is done, the magnetic forces applied to the spinning nuclei in one region of container 34 will be greater than the magnetic forces applied to the nuclei in other regions within container 34. The difference in applied magnetic forces will result in a corresponding difference in the precession frequencies in these regions. The shape of the frequency response curve of a nuclear resonator will depend upon the volume of nuclei permeated by each different strength of magnetic field. If equal volumes are permeated by each different strength of magnetic field, the frequency response characteristic will be a flat topped curve with an extremely sharp rise and fall at the two ends thereof corresponding to the sharp cut-off characteristic of the individual nuclei. In practicing the present invention, the bandwidth is preferably made sufficiently wide to pass all important components of the complex wave from source 10. As suggested above, if source 10 produces signals in the audio or video region of the spectrum, the variation in magnetic field required can be kept at a minimum by modulating the periodic signal on a high frequency carrier. If source 10 represents a radio receiver, the modulated signal may be obtained directly from the intermediate frequency amplifier of the system. It is important to remember that, although the overall pass-band of nuclear inductor 16 is made relatively broad, the hydrogen nuclei within each incremental volume permeated by a magnetic field of a particular field strength are still sharply tuned to a particular frequency and are individually saturable by a signal of this particular frequency. Therefore signals in one region may be completely saturated by a component of the complex wave from source 10, while signals at a different region are completely unsaturated since they are tuned to a different frequency.

Referring once again to Fig. 1, a signal from source 10 is applied through modulator circuit 11 and switch 12 to input coil 14 of resonator 16. The signal applied to coil 14 includes all components of the complex wave. The periodic components of the complex wave will cause saturation of the atomic nuclei in the incremental volumes tuned to the particular frequencies of the various components. This saturation is progressive in nature and for this reason the signal from source 10 is applied for a period of several seconds. It is not necessary that indicator 36 be in operation during this period. After source 10 has been connected to coil 14 for a sufficient length of time to cause appreciable saturation to take place in the nuclear inductor, switch 12 is operated to connect the output of sweep frequency oscillator 40 to coil 14. Since the signal from oscillator 40 remains at a constant amplitude, in the absence of any saturation effects in inductor 16 the amplitude of the signal picked up by coil 18 would be zero for frequencies outside the passband of inductor 16 and some constant value greater than zero for frequencies within the passband of inductor 16. In other words, the indication appearing on indicator 36 will be a plot of the magnetic field strength versus volume permeated by this field strength, or a plot of the amplitude versus frequency response of the system. However, as the signal from oscillator 40 sweeps in frequency across the passband of inductor 16, it encounters the saturation effects produced by the previously applied signal from source 10. These saturation effects will produce an abrupt decrease in amplitude of the signal transferred from coil 14 to coil 18 at the frequencies corresponding to the resonant frequencies of the saturated nuclei. The sudden decreases in amplitude of the output signal will appear as discontinuities or notches in the indications on the cathode-ray oscilloscope screen. A typical waveform is shown in Fig. 5. The positions of the notches 44 along the horizontal axis of the indication is indicative of the frequency of the component causing saturation. The magnitude of the decrease in amplitude as shown by the depth of the notch is a measure of the amplitude of the component causing saturation. The frequency at which a notch appears may be determined by means of a superimposed scale or by the addition of reference pips on the screen of the indicator. For a more accurate determination of frequency and magnitude of a saturation effect, a calibrated oscillator operated by hand or by a suitable servo system, and a sensitive voltmeter may be employed in place of, or in addition to, oscillator 40 and indicator 36 of Fig. 1.

The notches appearing in the signal shown in Fig. 5 will gradually disappear as the saturation effect present in volume 34 gradually disappears. If a continuous display is desired, switch 12 may be arranged to connect the source 10 and sweep frequency oscillator 40 alternately to coil 14. The embodiment of the invention just described has the advantage that the input signal from source 10 is entirely disconnected from coil 14 during the time that the indication is being displayed on the cathode-ray oscilloscope 36. Therefore confusion of the indication by stray coupling from coil 14 to coil 18 is eliminated.

A second embodiment of the invention is shown in Fig. 6. Like parts in Figs. 1 and 6 have been given identical reference numerals. In the embodiment shown in Fig. 6, the signal from source 10 is continuously applied to input coil 14 through a combining circuit 62. A constant amplitude, constant frequency signal from an oscillator 64 is also applied to combining circuit 62. The signals from source 10 and oscillator 64 are not heterodyned in combining circuit 62 but are both passed to the input coil 14. Preferably the signal supplied by oscillator 64 has a frequency lying just outside the normal passband of the nuclear inductor 16. Means are provided for uniformly varying the magnetic field supplied by magnet 24 in order to sweep the passband of the inductor 16. This change in magnetic field may be accomplished by a coil 66 wound on magnet 24 and energized by a generator 68. Preferably generator 68 supplies a current that increases uniformly with time and then decreases abruptly to its initial value. The horizontal sweep of indicator 36 is controlled by a signal from generator 68 so that the horizontal displacement of the cathode-ray beam is proportional to the strength of the magnetic field.

The embodiment of Fig. 6 is placed in operation as follows. With generator 68 inactive, the signal from the unknown source 10 is applied through combining circuit 62 to coil 14 where it causes saturation of the atomic nuclei tuned to the various frequencies of the components of the complex wave. After the signal from source 10 has been applied for a sufficient length of time to produce appreciable saturation, generator 68 is rendered active to cause a change in the intensity of the magnetic field supplied by a magnet 24. This change in intensity of the magnetic field has the effect of shifting the whole passband of the nuclear inductor to a new region of the frequency spectrum without appreciably altering the width or other characteristics of the passband. Thus the passband will be caused to sweep across the frequency supplied by oscillator 64. Again, in the absence of saturation effect, the indication appearing on the cathode-ray tube would be a plot of the frequency response characteristic of inductor 16, in this case a substantially rectangular curve. However, due to saturation induced by the signal from source 10, notches will appear in the indication which are similar to the notches shown in Fig. 5. These notches appear for the reason that atomic nuclei saturated at one frequency will remain saturated even though the intensity of the external magnetic field is altered to tune these nuclei to a different frequency. In the embodiment shown in Fig. 1 the scanning signal was swept across the passband. In the embodiment shown in Fig. 6 the passband is swept across the scanning signal. However, the results appearing on indicator 36 are substantially the same.

Various changes and modifications may be made in the embodiments described above without departing from the spirit and scope of the invention as defined by the hereinafter appended claims. For example, changes may be made in the circuits for coupling source 10 to the nuclear inductor and the nuclear inductor to the indicator. In the nuclear inductor changes may be made in the manner in which coils 14 and 18 are formed and disposed. The magnetic field need not be such as to give a flat topped frequency response curve since, once the shape of the curve without saturation is determined, changes in the curve due to saturation effects may be detected.

What is claimed is:

1. A harmonic analyzer for measuring the frequency and/or amplitude of the various components of a complex wave, said harmonic analyzer comprising a nuclear inductor provided with input and output connections, said nuclear inductor being saturable in response to signals exceeding a certain amplitude, a source of constant amplitude signal, means for supplying said complex wave and said constant amplitude signal to said input connection of said nuclear inductor, the combination comprising said inductor and said source of constant amplitude signal inducing means for causing at preselected times, a shift in the relative frequencies of said constant amplitude signal and the passband of said nuclear inductor, thereby to cause said passband to be scanned in frequency by said constant amplitude signal, and indicator means coupled to said output connection of said nuclear inductor for measuring the instantaneous amplitude of the signal appearing at said output connection.

2. A harmonic analyzer for measuring the frequency and/or amplitude of the various components of a complex wave, said harmonic analyzer comprising a nuclear inductor provided with input and output connections, said nuclear inductor being saturable in response to signals exceeding a certain amplitude, coupling means for supplying the complex signal to be measured to said input connection of said nuclear inductor, said coupling means including means for converting the individual components of said complex wave to signals having frequencies within the passband of said nuclear inductor and amplitudes greater than said certain amplitude, a source of constant amplitude, variable frequency signal coupled to said input connection, the frequency of said signal being variable over the passband of said nuclear inductor, indicator means coupled to said output connection, said indicator being capable of measuring the instantaneous amplitude of the signal appearing at said output connection as said constant amplitude signal sweeps in frequency across said passband, and means for excluding from said nuclear inductor, during the interval in which said signal sweeps in frequency across said passband, signals resulting from said complex wave.

3. A harmonic analyzer for measuring the frequency and/or amplitude of the various components of a complex wave, said harmonic analyzer comprising a nuclear inductor provided with input and output connections, said nuclear inductor being saturable in response to signals exceeding a certain amplitude, a source of constant amplitude, variable frequency signal, the frequency of said signal being variable over the passband of said nuclear inductor, input terminals to which a source of complex wave may be connected, switch means for selectively connecting said input terminals and said source of constant amplitude signal to said input connection of said nuclear inductor, and indicator means coupled to said output connection, said indicator being capable of measuring the instantaneous amplitude of the signal appearing at said output connection of said nuclear inductor which results solely from said constant amplitude signal as said constant amplitude signal sweeps in frequency across said passband.

4. A harmonic analyzer for measuring the frequency and/or amplitude of the various components of a complex wave, said harmonic analyzer comprising a nuclear inductor provided with input and output connections, said nuclear inductor having a relatively broad, flat passband characteristic and being saturable in response to signals exceeding a certain amplitude, modulator means responsive to a complex wave supplied to its input to provide at its output signals related in frequency and amplitude to the various components of said complex wave and having frequencies lying within the passband of said nuclear inductor, a source of constant amplitude, variable frequency signal, the signal from said last-mentioned source being caused to sweep in frequency across the passband of said nuclear inductor, switch means for selectively and alternatively connecting said modulator means and said source of constant amplitude signal to said input connection of said nuclear inductor, and an indicator connected to said output connection of said nuclear inductor and to said source of constant amplitude, variable frequency signal, said indicator providing a first indication proportional to the instantaneous amplitude of the signal appearing at said output connection and a second indication indicative of the instantaneous frequency of said variable frequency signal.

5. A harmonic analyzer for measuring the frequency and/or amplitude of the various components of a complex wave, said harmonic analyzer comprising a nuclear inductor provided with input and output connections and means for supplying a unidirectional magnetic field, said nuclear inductor having a relatively broad, flat, normally fixed passband, the frequency limits of said passband being controllable by controlling the intensity of said magnetic field, a source of constant amplitude, constant frequency signal, means coupling said source of said complex wave and said source of constant amplitude signal to said input connection of said nuclear inductor, means associated with said magnetic field supplying means for causing said magnetic field to change in intensity during certain preselected spaced time intervals, thereby to cause said normally fixed passband of said nuclear inductor to sweep in frequency across the frequency of said constant amplitude signal during said time intervals, and an indicator coupled to said output connection, said indicator being responsive only to signals having a frequency equal to that of said constant frequency signal and said indicator being capable of measuring the instantaneous amplitude of the signal appearing at said output connection as said passband is swept in frequency.

6. A harmonic analyzer for measuring the frequency and/or amplitude of the various components of a complex wave, said harmonic analyzer comprising a nuclear inductor provided with input and output connections and means for supplying a unidirectional magnetic field, said nuclear inductor having a relatively broad, flat, normally fixed passband, the frequency limits of said passband being controllable by controlling the intensity of said magnetic field, a source of constant amplitude, constant frequency signal, means coupling said source of said complex wave and said source of constant amplitude signal to said input connection of said nuclear inductor, means associated with said magnetic field supplying means for causing the intensity of said magnetic field to change at a preselected rate over a predetermined range of intensities during preselected spaced time intervals, thereby to cause said passband of said nuclear inductor to sweep in frequency across the frequency of said constant amplitude signal during said time intervals and a cathode-ray tube indicator coupled to said output connection and to said means for changing the intensity of said magnetic field, the indication produced by the beam of said cathode-ray tube indicator being caused to move in one direction by an amount proportional to the instantaneous amplitude of the signal appearing at said output connection of said nuclear inductor and in a second direction to a position indicative of the position in the frequency spectrum of the passband of said nuclear inductor.

7. A harmonic analyzer for measuring the amplitude and frequency of the various components of a complex wave, said harmonic analyzer comprising a nuclear inductor provided with input and output coils arranged to enclose a common volume, means within said common volume for supplying a copious quantity of hydrogen nuclei, means for establishing a unidirectional magnetic field within said common volume, said magnetic field varying in intensity throughout said common volume, said magnetic field being so distributed that equal numbers of said nuclei are influenced by each different intensity of said magnetic field, whereby said nuclear inductor is caused to have a relatively broad, flat passband characteristic, modulator means coupled to the source of said complex wave, said modulator means providing at its output signals related in frequency and amplitude to the various components of said complex wave, said output signals having frequencies lying within the passband of said nuclear inductor, a source of constant amplitude, variable frequency signal, the signal from said last-mentioned source being caused to sweep in frequency across the passband of said nuclear inductor, switch means for selectively and alternatively connecting said modulator and said source of variable frequency signal to said input coil, and a cathode-ray tube indicator connected to said output coil and said source of variable frequency signal, the indication produced by the beam of said cathode-ray tube indicator being caused to move in one direction by an amount proportional to the instantaneous amplitude of the signal induced in said output coil and in a second direction to positions indicative of the instantaneous frequency of said variable frequency signal.

8. A harmonic analyzer for measuring the frequency and/or amplitude of the various components of a complex wave, said harmonic analyzer comprising a nuclear inductor provided with input and output connections, said nuclear inductor being saturable in response to signals exceeding a certain amplitude, a source of constant amplitude signal, means for supplying said complex wave and said constant amplitude signal to said input connection of said nuclear inductor, the combination comprising said inductor and said source of constant amplitude signal including means for causing at preselected times, a shift in the relative frequencies of said constant amplitude signal and the passband of said nuclear inductor, thereby to cause said passband to be scanned in frequency by said constant amplitude signal, and indicator means coupled to said output means of said nuclear inductor and to said means for causing a shift in the relative frequencies of constant amplitude signal and the passband of said nuclear inductor, said indicator means being adapted to provide a display of the instantaneous amplitude of the signal appearing at said output connection as a function of the instantaneous difference between the frequency of said constant amplitude signal and the center frequency of said passband.

9. A harmonic analyzer for measuring the frequency and/or amplitude of the various components of a complex wave, said harmonic analyzer comprising a nuclear inductor provided with input and output connections, said nuclear inductor being saturable in response to signals exceeding a certain amplitude, a source of constant amplitude signal, means for supplying said complex wave and said constant amplitude signal to said input connection of said nuclear inductor, the combination comprising said inductor and said source of constant amplitude signal including means for causing at preselected times, a shift in the relative frequencies of said constant amplitude signal and the passband of said nuclear inductor, thereby to cause said passband to be scanned in frequency by said constant amplitude signal, an indicator element, means coupled to said output connection of said nuclear inductor for displacing said indicator element in a first direction from a reference position by an amount which is a selected function of the instantaneous amplitude of the signal appearing at said output connection, and means associated with said means for causing a shift in the relative frequencies of constant amplitude signal and said passband for displacing said indicator element in a second direction from a reference position by an amount which is a selected function of the instantaneous difference between the frequency of said constant amplitude signal and the center frequency of said passband.

References Cited in the file of this patent

UNITED STATES PATENTS

| | | |
|---|---|---|
| 1,933,306 | Berry et al. | Oct. 31, 1933 |
| 2,561,489 | Bloch et al. | July 24, 1951 |
| 2,589,494 | Hershberger | Mar. 18, 1952 |
| 2,598,301 | Rajchman | May 27, 1952 |

OTHER REFERENCES

Hahn: Physical Review, vol. 80, No. 4, November 15, 1950, pages 580–594.

UNITED STATES PATENT OFFICE
CERTIFICATE OF CORRECTION

Patent No. 2,820,944 January 21, 1958

William E. Bradley

It is hereby certified that error appears in the printed specification of the above numbered patent requiring correction and that the said Letters Patent should read as corrected below.

Column 7, line 26, for "inducing" read -- including --.

Signed and sealed this 22nd day of September 1959.

(SEAL)
Attest:

KARL H. AXLINE
Attesting Officer

ROBERT C. WATSON
Commissioner of Patents